(12) United States Patent
Arendarik (10) Patent No.: US 10,348,116 B2
(45) Date of Patent: Jul. 9, 2019

(54) WIRELESS POWER SOURCE AND METHOD FOR SIMULTANEOUS, NON-RADIATIVE, INDUCTIVE, WIRELESS POWER TRANSFER TO TWO OR MORE DEVICES TO BE CHARGED

(71) Applicant: FREESCALE SEMICONDUCTOR, INC., Austin, TX (US)

(72) Inventor: Stanislav Arendarik, Banská Bystrica (SK)

(73) Assignee: NXP USA, Inc., Austin, TX (US)

( * ) Notice: Subject to any disclaimer, the term of this patent is extended or adjusted under 35 U.S.C. 154(b) by 419 days.

(21) Appl. No.: 14/819,560

(22) Filed: Aug. 6, 2015

(65) Prior Publication Data

US 2017/0040826 A1    Feb. 9, 2017

(51) Int. Cl.
*H02J 7/02* (2016.01)
*H02J 50/10* (2016.01)
*H02J 50/40* (2016.01)
*H02J 50/12* (2016.01)

(52) U.S. Cl.
CPC .............. *H02J 7/025* (2013.01); *H02J 50/10* (2016.02); *H02J 50/12* (2016.02); *H02J 50/40* (2016.02)

(58) Field of Classification Search
USPC .................................................. 320/106–115
See application file for complete search history.

(56) References Cited

U.S. PATENT DOCUMENTS

| 6,597,076 B2 | 7/2003 | Scheible et al. | |
| 2013/0049484 A1* | 2/2013 | Weissentern | H02J 5/005 307/104 |
| 2013/0207603 A1* | 8/2013 | Kappeler | H01P 7/00 320/108 |
| 2014/0191717 A1* | 7/2014 | Hong | H02J 5/005 320/108 |
| 2014/0347008 A1* | 11/2014 | Chae | H02J 5/005 320/108 |

\* cited by examiner

*Primary Examiner* — Binh C Tat (57) ABSTRACT

A wireless power source 1 for simultaneous, non-radiative, inductive, wireless power transfer to two or more devices to be charged. The wireless power source 1 comprises a set of transmitter coils for generating an electromagnetic field 3 in a three-dimensional charging space 2 and a controller connected to the set of transmitter coils for controlling the set of transmitter coils to rotate the electromagnetic field 3 in the charging space around a rotational axis.

20 Claims, 5 Drawing Sheets

WIRELESS POWER SOURCE AND METHOD FOR SIMULTANEOUS, NON-RADIATIVE, INDUCTIVE, WIRELESS POWER TRANSFER TO TWO OR MORE DEVICES TO BE CHARGED

FIELD OF THE INVENTION

This invention relates to a wireless power source for simultaneous, non-radiative, inductive wireless power transfer to two or more devices to be powered, to a method of simultaneous, non-radiative, inductive wireless power transfer and a method for wireless power transfer.

BACKGROUND OF THE INVENTION

Wireless power transfer (WPT) or wireless energy transmission is the transmission of electrical power from a power source to a consuming device using a time-varying electromagnetic field, without using solid wires or conductors between the transmitter of the power and the receiver. In near-field or non-radiative techniques, power is transferred over short distances (typically less than 10 cm) mostly by magnetic fields using an inductive, resonant or non-resonant, coupling between coils or, in some devices, by electric fields using capacitive coupling between electrodes. Applications are for instance electric toothbrush chargers, RFID tags, smartcards, chargers for implantable medical devices like artificial cardiac pacemakers and other small appliances.

A current focus is the development of wireless systems to charge batteries of mobile and handheld computing devices, such as cell phones, digital music players and portable computers without being tethered to a wall plug. The best known example is the wireless charging of mobile phones and other mobile devices, for which the Wireless Power Consortium published the Qi resonant wireless charging standard. The Qi resonant wireless charging standard specifies a standard for inductive electrical power transfer over distances of up to 4 cm of low power (about 5 W) or medium power (up to 15 W) using an inductive coupling between two planar coils, i.e. between a primary coil (transmitting coil or TX) in a charger to a secondary coil (receiver coil or RX) in e.g. a mobile phone or other mobile device. The inductive coupling may be non-resonant (for which Qi uses the term "inductive") or resonant (for which Qi uses the term "resonant"). In case of a resonant coupling, each of the two coils is part of a respective resonant circuit, and both resonant circuits have about the same resonance frequency. Non-resonant charging is generally deemed to be suitable for systems where the distance between the two coils is less than their diameter, whereas resonant charging is deemed suitable for systems where that distance is larger than the diameter of the coils.

However, the known wireless charging systems requires a precise alignment, in position and/or orientation, between the primary coil and the secondary coil. Although Qi also specifies arrays of primary coils which provides for a wider charging area, still the secondary coil needs to be positioned on the surface of the charger and oriented precisely relative to the primary coil to enable an effective charging. Furthermore, in case multiple devices need to be charged they need to be posited parallel to each other on the surface in order to avoid shielding of a secondary coil by another secondary coil.

SUMMARY OF THE INVENTION

The present invention provides a wireless power source, a wireless power transfer system and a controller as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the FIGs. are illustrated for simplicity and clarity and have not necessarily been drawn to scale.

DETAILED DESCRIPTION OF THE PREFERRED EMBODIMENTS

Because the illustrated embodiments of the present invention may, for the most part, be implemented using electronic components and circuits known to those skilled in the art, details will not be explained hereinafter in any greater extent than that considered necessary for the understanding and appreciation of the underlying concepts of the present invention and in order not to obfuscate or distract from the teachings of the present invention.

Figure 1:
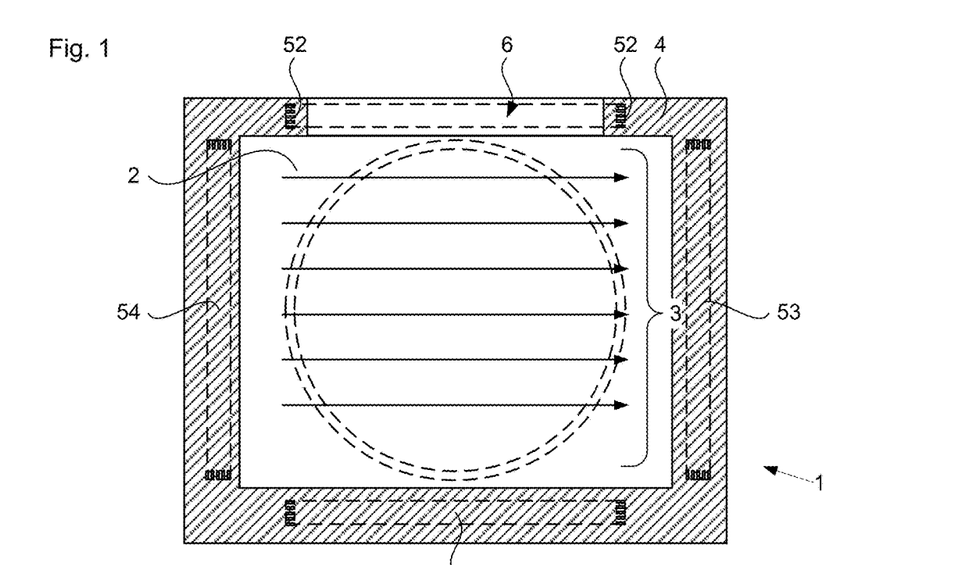
FIG. 1 shows a sectional view of an example of an embodiment of a wireless charging system.

Referring to FIG. 1, a wireless power charging system 1 is shown therein. The wireless power charging system 1 comprises a three dimensional charging space 2 in which an electromagnetic field 3 can be provided which powers devices to be powered present in the charging space. The power may e.g. be used to charge a battery of the device (or otherwise to store energy thereon) in order to be able to use the device after the power transfer has terminated. The power may additionally or alternatively be used to operate the device already during the power transfer. In the shown example, the charging space 2 is defined by a housing 4 of the system, in which a wireless power source 5 is provided. The housing is box-shaped, and the charging space a cuboid, however it will be apparent that the charging space and/or the housing may have any other suitable shape, such as spherical or cylindrical. The housing 4 encloses the charging space 2, and the wall of the housing is provided with a passage 6 through which devices to be powered can be placed in the charging space.

It will be apparent that the wireless charging system 1 may be implemented in a different manner, and for example be implemented without a housing that encloses the charging space. For instance, the wireless charging system may have a dish or other shaped platform on which the devices can be placed, the charging space above the platform being open and the charging space being provided with an electromagnetic field by a wireless power source, such that the charging space above the platform forms a three-dimensional charging space.

As shown in FIG. 1, the system 1 comprises a wireless power source 5 for simultaneous, non-radiative, inductive, non-resonant or resonant, wireless power transfer to devices in the charging space 2. The wireless power source 5 comprises a set of transmitter coils 51-56 capable of generating the electromagnetic field 3 in the charging space, which as shown is defined by the planes of the transmitter coils. The wireless power source 5 further comprises a controller, CNTR, 7 (not shown in FIG. 1) connected to the set of transmitter coils 51-56. The controller 7 controls, when the wireless power source 5 is in operation, the set of transmitter coils 51-56 to rotate the electromagnetic field in the three-dimensional charging space around a rotational axis, as explained below in more detail with reference to FIGS. 2-4.

Because of the rotating field, the need for a precise orientation and positioning of a receiving coil is obviated. More specifically, the rotating electromagnetic field allows to transfer power to the devices with less dependence on the actual orientation of the receiver coils relative to the coil system of the wireless power source. The electromagnetic field rotates, and accordingly at some point in time the direction of the electromagnetic field will be oriented parallel to the axis of the receiver coil and hence allows for a sufficient electromagnetic coupling to transfer power, independent of the orientation of the receiver coil.

Furthermore, the wireless power source 5 generates an electromagnetic field in a three dimensional charging space, rather than the 2-dimensional surface of the known solutions. Accordingly, the receiving device can be positioned anywhere in the charging space, and for example be stacked on other receiving devices. Additionally, the rotating electromagnetic field 3 allows to transfer power to such stacked receiving devices. More specifically, the risk that a receiving device shields another receiving device from the electromagnetic field is reduced since the magnetic flux will come from different directions as the field is rotated and accordingly will reach the shielded device from another side than where the shielding receiving device is situated.

In the example of FIG. 1, the charging space 2 is defined by the coils 51-56, which are arranged in a multiaxial arrangement, i.e. the axis of the coils are not all parallel to each other. The coil arrangement thus allows to generate individually controllable, non-parallel, electromagnetic fields which are superimposed. As explained below, by a suitable control of the individual non-parallel electromagnetic fields, the resulting electromagnetic field can be rotated.

Figure 9:
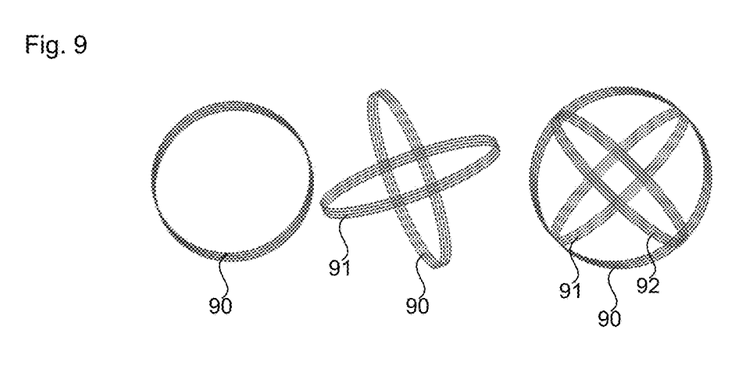
FIG. 9 shows perspective views of examples of receiver coils suitable for devices to be powered by a wireless charging system.
Figure 10:
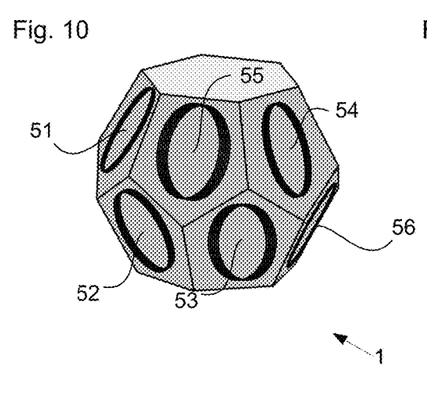
FIGS. 10 and 11 show perspective views of examples of embodiments of multiaxial wireless charging systems.
Figure 11:
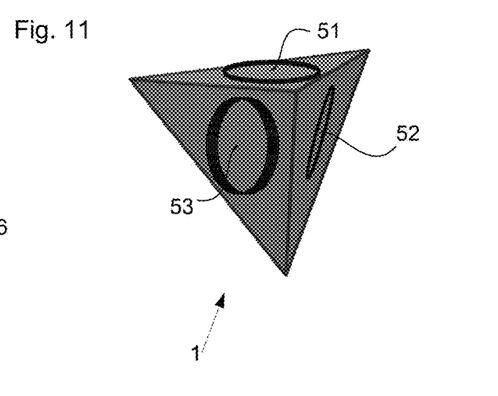

Although in the shown example the axes are orthogonal, it will be apparent that the multiaxial arrangement may include coils with a non-orthogonal and non-parallel orientation of their axes. For example, instead of a rectangular cuboid configuration as in the example, the coils may be arranged in a parallelepiped arrangement. Furthermore, the multiaxial arrangement may have less than three axes or more than three, and the coils for example define any suitable shaped charging space, for example a charging space shaped as a convex polyhedron, which may be regular, or a bowl-shaped charging space. FIGS. 9 and 10 show examples of a charging space 2 with coils 51-56 resp. 51-58 in a non-orthogonal configuration. In the example of FIG. 9, for instance the charging space is a truncated hexagonal trapezohedron, of which the fourteen faces are provided with respective coils, and in FIG. 10, the charging space is a tetrahedron of which the four faces are provided with respective coils. It will be apparent that not all sides of the charging space need to be provided with coils, and notably in case the charging space has more than 6 faces or in case other coils than Helmholtz coils are used.

Figure 5:
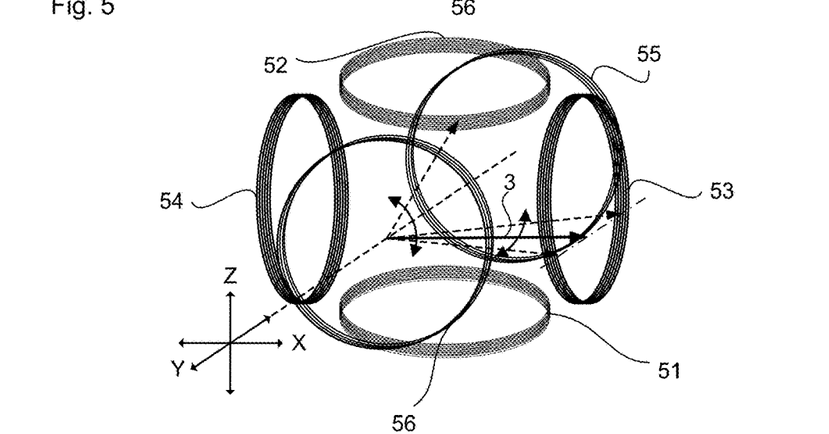
FIG. 5 shows a perspective view of an example of a multiaxial coils system capable of generating a rotating and/or precessing electromagnetic field.

As show, in FIG. 1 and more clearly seen in FIG. 5, the set 5 of coils comprises two or more (in this example three) pairs of coils (51-52;53-54;55-56), the coils of each pair defining the charging space at opposite sides in one direction. As known, a pair of coils separated from each other allows to generate a, for practical purposes, homogenous electromagnetic field in the charging space between the coils and notably when they are placed symmetrically along a common axis, the arrangement also being known as a Helmholtz coil. It will be apparent that the field is homogenous for practical purposes, and that a variation of about 10% between the centre of the charging space and the plane of the coils is for practical purposes homogeneous. In the shown example, the set of coils comprises Helmholtz coils with orthogonal axes, in the x, y and z direction of the coordinate system shown in FIG. 2. Thus, in all three dimensions a homogenous electromagnetic field can be generated in the charging space 2 and by a suitable control, e.g. as explained below, the orientation of the electromagnetic field resulting from the superposition of the three orthogonal fields (also referred to in this example as the x-, y- and z-field) can be controlled.

Figure 6:
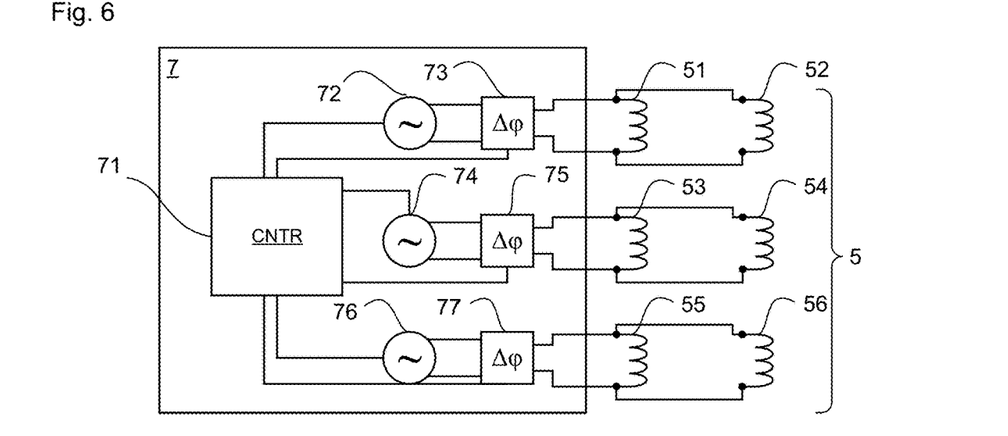
FIG. 6 shows a block diagram of an example of an embodiment of a controller, suitable for the examples of FIGS. 1-5.

As shown in FIG. 5, the multiaxial coil arrangement allows to generate an electromagnetic field that can be rotated, as indicated in FIG. 5 with arrows φ and θ. Since the rotation around the axes may be simultaneous, the field can be rotated and/or to precessed. The controller 7 shown in FIG. 6 is arranged to change the orientation of the rotational axis. The controller 7 is arranged to control the electromagnetic field to rotate and/or to precess the rotational axis during the wireless power transfer.

Figure 2:
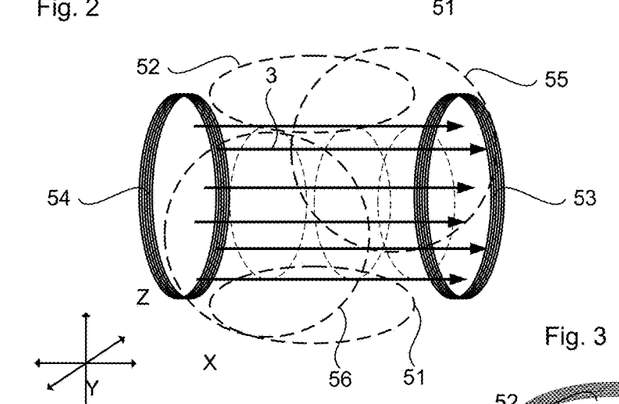
FIG. 2 schematically shows a perspective view of an example of a multiaxial coils system generating an electromagnetic field in a first direction.
Figure 3:
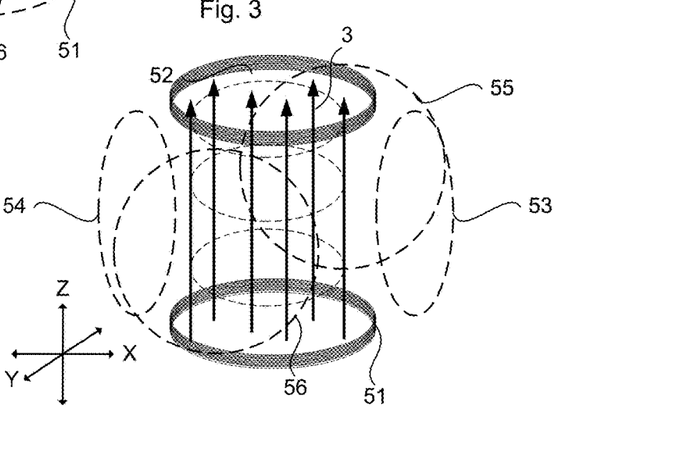
FIG. 3 shows a perspective view of the example of FIG. 2 generating an electromagnetic field in a second direction.
Figure 4:
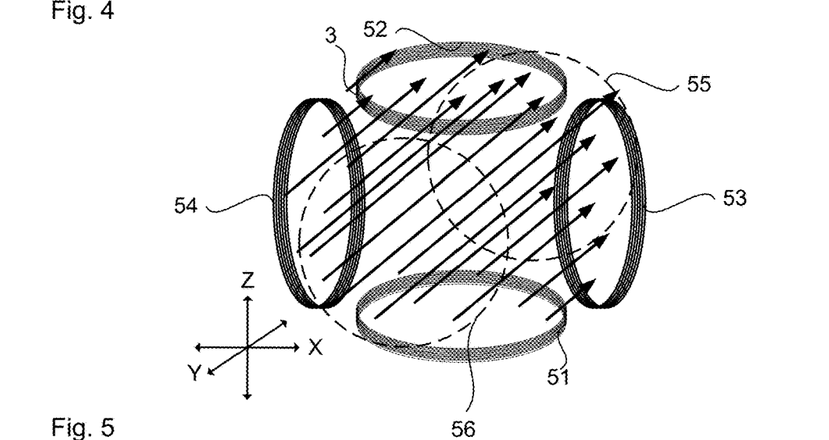
FIG. 4 shows a perspective view of the example of FIG. 2 generating an electromagnetic field in a third direction.

Referring to FIGS. 2-4, the rotation of the electromagnetic field may be performed by superimposing fields of the coils with different axes. In FIGS. 2-4, a 3-dimensional coordinate system with orthogonal x-, y- and z-axes is shown for ease of understanding. As shown in FIG. 2, the coils with the coil axis in (in this example) parallel to the x-axis (also referred to as the x-coils), generate an electromagnetic field parallel to the x-axis when a current flows through the coils. Likewise, as shown in FIG. 3 the coils with the coil axis in (in this example) parallel to the z-axis (also referred to as the z-coils), generate an electromagnetic field parallel to the z-axis when a current flows through the coils. Accordingly, by controlling the current flowing through the coils the orientation of the field can be rotated. The field can thus be rotated step-wise, for example in steps of 90 degrees, by switching on and off the current through the x-, y- and z-coils as desired.

However, a control with finer granularity or even continuous is possible as well. Referring to FIG. 4, for example, in case both the x-coils and the z-coils generate an electromagnetic field of the same strength (e.g. in case of coils with similar characteristics when the same current flows), the field parallel to the x-axis is superimposed on the field parallel to the z-axis, resulting in a field 45 degrees tilted relative to both axes, or said differently a field rotated along the y-axis. The angle can be controlled by reducing (or increasing) the electromagnetic field of e.g. the x-coils relative to that generated by the z-coils. For instance, an alternating current can be provided to the x-coils that is phase shifted relative to the z-coils, resulting in a continuous rotation of the field with a frequency equal to the frequency of the alternating current. In a similar manner, the field can be rotated continuously along the x-axis by the current flowing through the y-coils and the z-coils, and along the z-axis axis by the current flowing through the x-coils and the y-coils.

Referring to FIG. 6, the controller 7 shown therein is arranged to change the orientation of the rotational axis. The controller 7 is arranged to control the three-dimensional electromagnetic field to rotate and/or to precess the rotational axis during the wireless power transfer, by controlling the individual currents provided to the coils with different axes. In this example, the controller is arranged to change the rotation and/or precession in a continuous manner. However, the controller may alternatively control the electromagnetic field to be rotated stepwise, e.g. by alternatingly providing current to the x-coils, the y-coils and the z-coils to have respectively the field oriented along the x-axis, y-axis and z-axis.

In the shown example, the controller 7 is connected to control controllable phase shifters 73,75,77 and can for instance control the rotation by setting a phase of an alternating current flowing through one or more of the transmitter coils relative to a phase of alternating current flowing through another of the transmitter coils. To that end, in the shown example the controller has an alternating current source which is connectable to the transmitter coils to simultaneously drive alternating currents through all transmitter coils. More specifically, in this example, the controller comprises current sources 72,74,76 which provide an alternating current to the respective coils. In the example different current sources are used. However, if will be apparent that e.g. in case the coils of the different axes have similar characteristics a current source may be shared by the coils of two or more of the axes, and for instance only the phase of the current be controlled individually.

In FIG. 6, the respective phase shifters 73,75,77 are connected to the coils to phase-shift the alternating current flowing through the coils and a phase shift controller 71 is connected to respective control inputs of the phase shifters to control the phase shift of the phase shifters. It will be apparent that the controller 71 may be, for example a programmed microcontroller connected with a respective Digital-to-Analog converter (DAC) output to the control of a phase shifter 73,75,77, and which outputs at the DAC an analog signal of which the amplitude is proportional to a digital value generated as can be described with the pseudo-code:

phase x-coils=phase0
  phase y-coils=phase0+field angle1
  phase z-coils=phase0+field angle2

Figure 8:
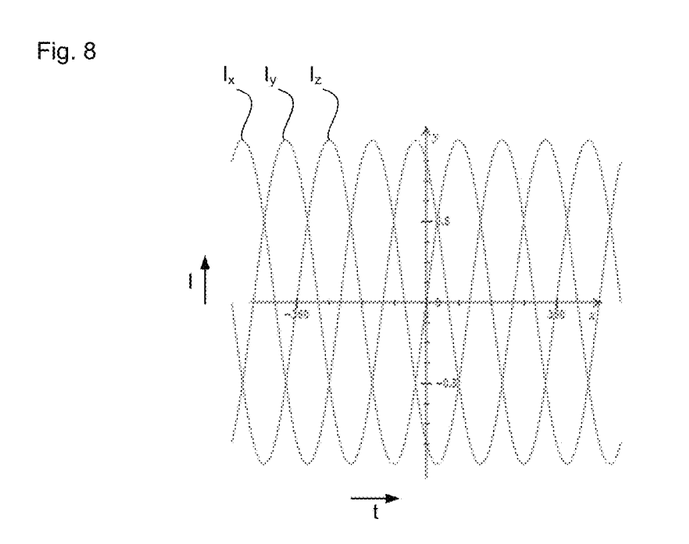
FIG. 8 shows a graph of currents suitable for driving coils of a wireless power transmitter with a 3-axes orthogonal coil system.

In case the phase difference is set to, for instance 120 degrees between the x-coils and the y-coils and 240 degrees between the x-coils and the z-coils respectively the electromagnetic field will rotate 360 degrees and the rotating axis will precess 360 degrees as well (both with the frequency of the alternating current). FIG. 8 schematically shows the coil currents corresponding to those phase shifted currents. It will be apparent that the resulting electromagnetic field can be calculated using simple geometric relations as if generated by a current equal to $$I_{effective} = \sqrt[2]{I_x^2 + I_y^2 + I_z^2},$$

which if the currents have the same amplitude $I_{max}$ will be equal to $\sqrt{(3/2)} \cdot I_{max}$.

Figure 12:
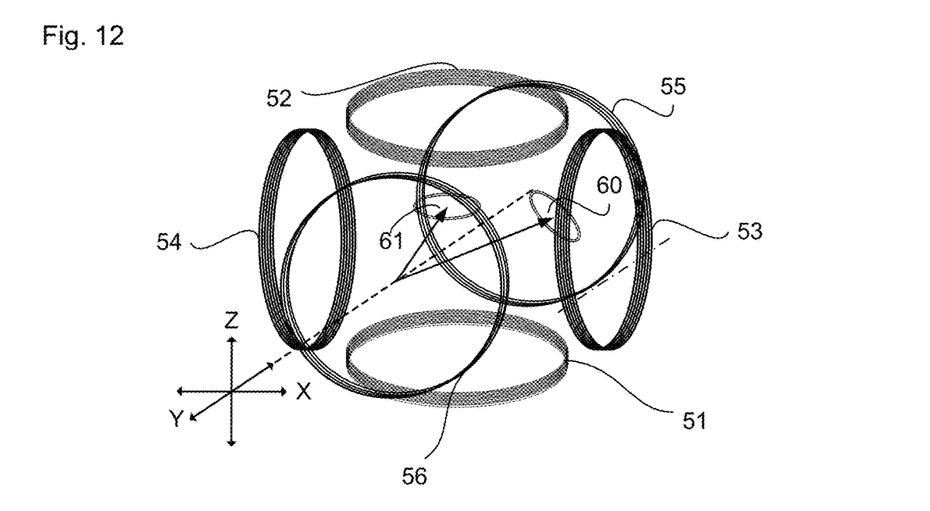
FIG. 12 schematically shows a perspective view of an example of a multiaxial coils system for transferring power to multiple, in the drawing two, receiver coils quasi-simultaneously.

A more complex control of the field than just rotating is also possible. For instance, as illustrated in FIG. 12 which shows two receiver devices 60,61 in the charging space 2, the position and orientation of the receiving devices may be taken into account when orienting the electromagnetic field. For example, an initial scan may be performed where the electromagnetic field is rotated 360 degrees around both the x-axis and the z-axis and the orientation of the electromagnetic field for which the receiving devices 60,61 absorb maximum power be determined, either for each receiving device individually (e.g. by determining local absorption peaks) or combined. After the scan, the electromagnetic field may then just be switched between the orientations with maximum power absorption (as indicated in FIG. 12 with the arrows pointing to the devices 60,61) or between ranges around those orientations (e.g. if maximum power absorption is found at angles θ and φ, between a range from θ−Δ to θ+Δ and a range from φ−Δ to φ+Δ with Δ being a predefined margin) rather than a continuous rotation, e.g. by providing direct currents to the coils of the different axes of relative magnitudes such that the desired orientation is obtained, as explained above with reference to FIGS. 2-4. Likewise by setting the phase, the range (in degrees) over which the field rotates can be set. For instance, the field will rotate 360 degrees around the z-axis if the phase of the y-coils is 90 degrees shifted relative to the x-coils (assuming they are of similar characteristics and driven by the same alternating current, and hence generate fields of approximately equal strength). However, if the shift not 90 degrees, and the amplitudes differ, the electromagnetic field will rotate around the z-axis in a different manner over a more limited range than 360 degrees.

Figure 7:
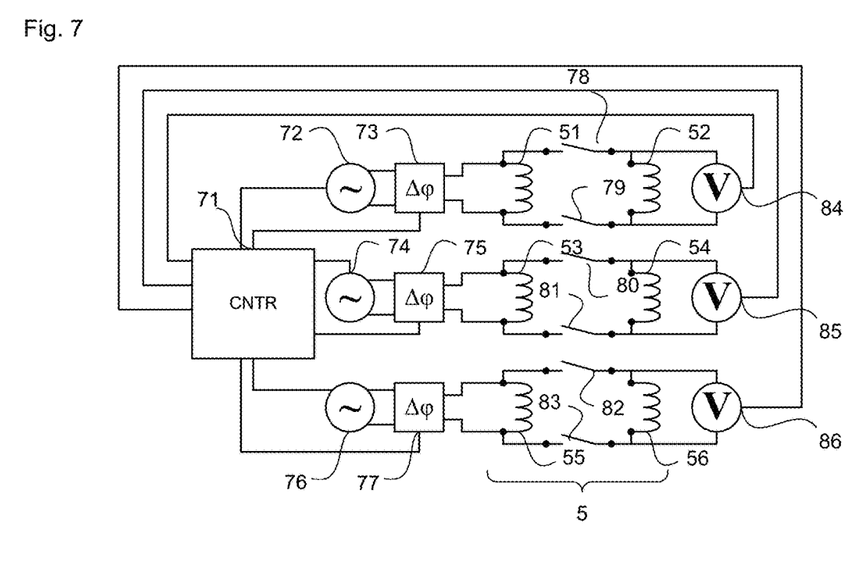
FIG. 7 shows a block diagram of another example of an embodiment of a controller, suitable for the examples of FIGS. 1-5.

Referring to FIG. 7, the wireless power source may further comprise a detector 84-86 for detecting a parameter of a device to be powered present in the charging space. As shown in FIG. 7 the controller 71 is connected to the detector 84-86 and can control the orientation as a function of the detected parameter. The parameter of the detected devices can e.g. be one or more of the group consisting of: a number, a position, an orientation. For example, the controller can be arranged to vary the orientation of the electromagnetic field as a function of a coupling coefficient between the devices and the coils, i.e. rotate the electromagnetic field to an orientation that corresponds to a (local) maximum of the coefficient The detector is in this example a power detector connectable to a magnetic field sensor in the three-dimensional electromagnetic field, for detecting a perturbation of the electromagnetic field received by the electromagnetic field sensors. More specifically, in the shown example, the electromagnetic field sensors comprise a sensing coil parallel to an axis of field generating coil and for each axis a detector is provided, thereby allowing to determine this in 3-dimensions. In the shown example, the power detectors comprise voltage meters V that measure, for each of the axes, the voltage over a coil oriented parallel to the axis as a function of the voltage provided to another coil parallel to the axes. The voltage meters V thus measures the voltage induced by the magnetic field of the other coil and hence the coupling.

To that end, as shown, switches 78-83 are provided are controlled by the controller 71 to interrupt the current to the coil that is measured. The voltage over the coil is then induced by the electromagnetic field generated by the other coil, and, inter alia, dependent on the coupling factor between the coils. The coupling factor reduces if objects, e.g. a receiver coil, absorbing the electromagnetic field are placed in the electromagnetic field, i.e. placed between the coils in this example. The controller 71 can thus measure the coupling coefficients as the field rotates and compare this e.g. with calibration or other data representing the coupling coefficients as a function of field orientation without objects absorbing the electromagnetic field between the coils. The controller 71 can then determine whether or not the coupling factor has changed, and thus an object is present. If the controller 71 determines that the object is a device to which power has to be transferred, the controller 71 can control the electromagnetic field to be oriented such that the object receives and absorbs the power to a desired level.

Referring to FIG. 9, the devices which have to receive power, may be of any suitable type. The devices may for example consume at least 0.1 W of power, such as between 0.1 and 5 W or between 5 W and 120 W. The devices may comprise a battery to be charged by the wireless power charging system. The devices may each comprise a receiving coil system. FIG. 9 shows several suitable coils systems, although others may be used as well. As shown, the receiving coil may be a single axis system, e.g. with a single coil or multiple coils with parallel axes.

However, the receiving coil system may also comprise two or more receiver coils 90-92 with non-parallel axes, such as the two axes system shown in the middle with coils 90,91 with coinciding centres, but oriented with their axes perpendicular or the three axes system shown in the right hand side in FIG. 9 with coils 90,92 with coinciding centres but oriented with their axes perpendicular. The axes of the receiving coils can have various, different, orientations, in the charging space relative to the axes of the transmitting coils, depending of course on the orientation of the device. A multiaxial receiving coil system allows to receive power from an electromagnetic field with different orientations. Thus, the positioning and orientation of the receiving coil becomes less critical than in the known systems described in the background section.

In the foregoing specification, the invention has been described with reference to specific examples of embodiments of the invention. It will, however, be evident that various modifications and changes may be made therein without departing from the scope of the invention as set forth in the appended claims and that the examples are not intended to be limiting the scope of the claims.

For instance, it will be apparent that for example the devices to be charged may be coupled to one or more of the coils through a resonant coupling or through a non-resonant coupling.

Also, the invention is not limited to physical devices or units implemented in non-programmable circuitry but can also be applied in programmable physical devices or units able to perform the desired device functions by operating in accordance with suitable program code. For example, the controller can be implemented as a microcontroller programmed with code that controls a phase shifter. Also, the controller can be implemented in a non-programmable circuit, for example by synthesis of program code, e.g. of code in SystemC, into a design for a physical circuitry, such as in VHDL or any other appropriate hardware description language, and subsequent manufacturing of the electronic circuit according to the design.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

For example, in one embodiment, the illustrated examples may be implemented as circuitry located on a single integrated circuit, i.e. on one or more dice within an integrated circuit package, or within a same device. For example, the controller 7, current sources and phase shifters 72 72-77 may be implemented as a single integrated circuit, e.g. an analog integrated circuit with a state machine or a digital controller. Alternatively, the examples may be implemented as any number of separate integrated circuits or separate devices interconnected with each other in a suitable manner. For example, the controller may be a microcontroller with DACs connected to external current sources and phase shifters 72 72-77 and connectable, in case the system is implemented as shown in FIG. 7, with e.g. analog to digital converters to the voltage meters 84-86. Thus, those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "one or more" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "one or more" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

The invention claimed is:

1. A wireless power source for simultaneous, non-radiative, inductive, wireless power transfer to two or more devices to be powered, the wireless power source comprising:
   a set of transmitter coils for generating an electromagnetic field in a three-dimensional charging space, wherein the set of transmitter coils includes a first transmitter coil and a second transmitter coil arranged such that a first axis of the first transmitter coil is not parallel to a second axis of the second transmitter coil; and
   a controller connected to the set of transmitter coils for controlling the set of transmitter coils, including the first and second transmitter coils, to rotate the electromagnetic field in the charging space around a rotational axis wherein the electromagnetic field in the charging space around the rotational axis is generated by superimposing a first electromagnetic field generated by the first transmitter coil parallel to the first axis with a second electromagnetic field generated by the second transmitter coil parallel to the second axis.

2. The wireless power source as claimed in claim 1, wherein the controller is arranged to change the orientation of the rotational axis.

3. The wireless power source as claimed in claim 1, wherein the controller is arranged to control the electromagnetic field to rotate and/or to precess the rotational axis during the wireless power transfer.

4. The wireless power source as claimed in claim 1, wherein the controller comprises a phase shifter and a phase shift controller to control the phase shifter, for controlling the orientation by changing a phase of an alternating current flowing through at least one of said transmitter coils relative to a phase of alternating current flowing through another of said transmitter coils.

5. The wireless power source as claimed in claim 1, wherein the controller is connectable to an alternating current source, and connectable to the transmitter coils to simultaneously drive alternating currents through all transmitter coils.

6. The wireless power source as claimed in claim 1, further comprising a detector for detecting a parameter of a device to be charged present in the charging space, and wherein the controller is connected to the detector for controlling the orientation as a function of the detected parameter.

7. The wireless power source as claimed in claim 6, wherein the parameter of the detected devices is one or more of the group consisting of: a number, a position, an orientation.

8. The wireless power source as claimed in claim 6, wherein the detector comprises a power detector connectable to an electromagnetic field sensor in the three-dimensional electromagnetic field, for detecting a perturbations of the electromagnetic field of electromagnetic power received by the electromagnetic field sensors.

9. The wireless power source as claimed in claim 1, wherein the devices are electromagnetically coupled to at least one of the coils through a resonant coupling.

10. The wireless power source as claimed in claim 1, wherein the devices are electromagnetically coupled to at least one of the coils through a non-resonant coupling.

11. The wireless power source as claimed in claim 1 wherein the controller is arranged to vary the orientation of the electromagnetic field as a function of a coupling coefficient between the devices and the coils.

12. The wireless power source as claimed in claim 1, wherein the transmitter coils each have an axis, and the axes of the coils are orthogonal.

13. The wireless power source as claimed in claim 1, wherein the transmitter coils each have an axis, and the axes of the coils are non-orthogonal and non-parallel.

14. The wireless power source as claimed in claim 1, wherein the charging space is defined by the coils, and the set of coils comprise two or more pairs of coils, the coils of each pair defining the charging space at opposite sides.

15. A wireless power transfer system, comprising:
   a three dimensional charging space in which two or more devices to be powered can be provided; and
   a wireless power source including:
      a set of transmitter coils for generating an electromagnetic field in a three-dimensional charging space, wherein the set of transmitter coils includes a first transmitter coil and a second transmitter coil arranged such that a first axis of the first transmitter coil is not parallel to a second axis of the second transmitter coil; and
      a controller connected to the set of transmitter coils, including the first and second transmitter coils, for controlling the set of transmitter coils to rotate the electromagnetic field in the charging space around a rotational axis wherein the electromagnetic field in the charging space around the rotational axis is generated by superimposing a first electromagnetic field generated by the first transmitter coil parallel to the first axis with a second electromagnetic field generated by the second transmitter coil parallel to the second axis.

16. The wireless power transfer system as claimed in claim 15, wherein the devices comprise a battery to be charged by power transferred by the wireless power charging system.

17. The wireless power transfer system as claimed in claim 15, wherein the devices to be charged each comprise a receiving coil system.

18. The wireless power transfer system as claimed in claim 17, wherein the receiving coil system comprises two or more receiver coils with non-parallel axes.

19. The wireless power transfer system as claimed in claim 17, wherein the axes of the receiving coils can have various, different, orientations, in the charging space relative to the axes of the transmitting coils.

20. A method comprising:
   arranging a first transmitter coil and a second transmitter coil of a set of transmitter coils along at two non-parallel axes in a three-dimensional charging space;
   connecting a controller to the set of transmitter coils; and
   controlling, by the controller, the set of transmitter coils, including the first and second transmitter coils, to rotate an electromagnetic field in the charging space around a rotational axis, wherein the electromagnetic field in the charging space around the rotational axis is generated by superimposing a first electromagnetic field generated by the first transmitter coil parallel to an axis of the first transmitter coil with a second electromagnetic field generated by the second transmitter coil parallel to an axis of the second transmitter coil.

* * * * *